Patented Dec. 15, 1942

2,305,032

UNITED STATES PATENT OFFICE 2,305,032

CONCENTRATION OF ORES BY FLOTATION

Chester L. Read, Westfield, N. J., assignor to Standard Oil Development Company, a corporation of Delaware No Drawing. Application May 15, 1940, Serial No. 335,325

2 Claims. (Cl. 209—166)

This invention relates to improvements in processes of ore concentration and particularly in mineral oils used for concentrating ores by flotation.

It is known that the phenomena of flotation are not entirely physical in their nature. Chemical reactions play a large part in flotation processes so that by adding certain reagents the operation can be modified or completely changed. In selective flotation, minerals are made to float or not to float by the use of various reagents which produce definite effects on the surface phases of the mineral particles. When reagents of one class are absorbed by certain mineral particles, the mineral particles at the same time absorb gases, that is, the reagent tends to film the particle of mineral which in turn attracts a bubble film, and as a result the mineral particle acquires sufficient buoyancy to float on the liquid and be removed with the froth. The term "oil" in flotation has been gradually acquiring the meaning of hydrocarbon oil free of polar groups. As such, the use of oils in flotation of sulfide ores has been decreasing both as a relative and absolute basis. The hydrocarbon oils are not collectors but are considered as protectors of coatings that are formed by collectors.

It is an object of this invention to provide a petroleum oil or petroleum oil derivative that is more chemically active and will serve as a collector in cleaner separation of a mineral ore from the gangue.

According to this invention, sludge resulting from the acid treatment of naphthas or other light petroleum distillates containing 0.3% of sulfur or more is processed to separate the oil and acid components. The acid sludge is diluted by adding water and allowed to settle and stratify. The oil phase is separated and caustic washed to neutralize and to remove any entrained acid components and further refined by distilling. The distillate obtained is a product having an end point of approximately 700° F. The distillate is extracted with sulfur dioxide. Other preferential solvents, such as phenol, furfural, etc., may be used to extract the distillate. The solvent is then separated from the extracted oil and the solvent-free extract oil is then used as a flotation reagent. For example, acid sludge separated after treating debutanizer bottoms with concentrated sulfuric acid is diluted with water and allowed to settle. The separated aqueous acid layer is removed and the oil layer having a specific gravity of 1.0607 and an acid content of 15.4% is washed with 40° Bé. aqueous solution of sodium hydroxide. The oil is made slightly basic, 1% sodium hydroxide in excess of that required for neutralization being used. The oil in the amount of 2860 cc. is charged to a still, 1060 cc. of water and 690 cc. of an oil being distilled off leaving a residue of 1110 cc. The oil distillate is a 38.3% yield based on hydrocarbons present and has a specific gravity of 0.8978 and an aniline point of 57° F., the distillation range being as follows:

*Distillation range*

| Per cent off | Temp. °F. at 760 mm. |
|---|---|
| I. B. P. | 200 |
| 10 | 329 |
| 20 | 366 |
| 30 | 396 |
| 40 | 425 |
| 50 | 457 |
| 60 | 500 |
| 70 | 541 |
| 80 | 574 |
| 90 | 615 |
| 95 | 655 |
| F. B. P. | 728 |

99% recovery

The distillate oil is extracted with 75% $SO_2$ at −40° F., the raffinate yield being 56.4% based on the distillate and the extract yield being 43.6%. The solvent is separated from the extract, thus giving the improved flotation oil having the following physical characteristics: specific gravity of 0.9163, aniline point of 6° F., and bomb sulfur 6.4%.

This flotation oil is very slightly soluble in water with which it forms emulsions and which it causes to froth to some extent. The following flotation tests were carried out and the following points were brought out:

(1) The flotation oil acts as a collector for substantially all of the sulfide minerals, such as galena (PbS), chalcocite ($CuFeS_2$), pyrite ($FeS_2$), or bornite ($Cu_3FeS_4$). It seems particularly effective in floating bornite.

Metallurgical data for flotation tests

| Reagent | Lb./ton of ore | Terpineol (frother) lb./ton | pH | Weight of concentrate percent of feed | Purity of concentrate | Loss in tailings |
|---|---|---|---|---|---|---|
| 10% GALENA (PbS) AND 90% QUARTZ (SiO$_2$) ORE | | | | | | |
| None | None | 0.10 | 8.5 | 7.4 | Good | 30-40% |
| Xanthate[1] | 0.04 | 0.10 | 8.3 | 10.1 | ...do... | Under 2% |
| Oil reagent[2] | 0.08 | 0.10 | 8.0 | 10.2 | ...do... | Do. |
| 10% GALENA (PbS) AND 90% CALCITE (CaCO$_3$) ORE | | | | | | |
| None | None | 0.10 | 8.8 | 5.2 | Med. grade | 55-65% |
| Xanthate | 0.08 | 0.10 | 8.7 | 10.8 | Good | Under 2% |
| Oil reagent | 0.08 / 0.16 | 0.10 | 8.6 | 10.9 / 12.0 | ...do... / ...do[3]... | 5-10% / Under 2% |
| COPPER ORE: 9.5% BORNITE (Cu$_3$FeS$_4$), 90.5% GANGUE (MOSTLY QUARTZ) | | | | | | |
| None | None | 0.10 | 8.9 | 2.7 | Good | 70-80% |
| Xanthate | 0.04 | 0.10 | 8.9 | 9.6 | ...do... | Under 2% |
| Oil reagent | 0.08 | 0.10 | 8.6 | 9.6 | ...do... | Do. |

[1] Potassium ethyl xanthate.
[2] Petroleum oil.
[3] Appeared to be slight excess of oil.

*Conditions of tests:*

Ore charge:
- Ore (minus 20 mesh) ............ g... 500
- Water ............................ cc... 250
- Pebbles ......................... kg... 3.9

Grind for 30 min. in Abbe Trojan-size mill at 84 R. P. M.

Float in Fagergren laboratory flotation machine (600-gram size):
- Agitation with collector addition .......... min... 2
- Flotation ................................. do..... 6-8

This flotation oil is also suitable for use in the concentration of molybdenite ore, graphite and coal. It may also be used in combination with other oils, such as pine oil or mercaptans.

I claim:

1. A process of effecting the concentration of sulfide minerals, molybdenite ore, graphite and coal, which consists in agitating and aerating a pulp of the minerals in the presence of frothing and collecting agents wherein the collecting agent comprises a mineral oil having a specific gravity of about 0.9163, an aniline point of about 6° F. and a bomb sulfur of about 6.4% and being very slightly soluble in water, the mineral oil being obtained by treating a petroleum oil of high sulfur content with strong sulfuric acid, separating the acid sludge formed, diluting the acid sludge with water, settling the acid-sludge-water mixture to form layers, separating an aqueous acid layer, neutralizing the oil layer, distilling the oil up to a temperature of 700° F., extracting the distillate with a selective solvent of the group consisting of liquid sulfur dioxide, phenol and furfurol, separating the solvent and extract and separating the solvent from the extract to obtain the mineral oil.

2. A process of effecting the concentration of sulfide minerals, molybdenite ore, graphite and coal, which consists in agitating and aerating a pulp of the minerals in the presence of frothing and collecting agents wherein the collecting agent comprises a mineral oil having a specific gravity of about 0.9163, an aniline point of about 6° F. and a bomb sulfur of about 6.4% and being very slightly soluble in water, the mineral oil being obtained by hydrolyzing a sludge produced by treating sulfur containing mineral oils with strong sulfuric acid, separating the sulfuric acid sludge formed, diluting with water, settling the acid-sludge-water mixture to form layers, separating an aqueous acid layer, neutralizing the oil layer, distilling the oil up to a temperature of 700° F., extracting the distillate with a selective solvent of the group consisting of liquid sulfur dioxide, phenol and furfurol, separating the solvent and extract and separating the solvent from the extract to obtain the mineral oil.

CHESTER L. READ.